INVENTORS
ROBERT J.S. BROWN
JOHN E. COOLIDGE

Aug. 31, 1965    R. J. S. BROWN ETAL    3,204,178
AMPLIFIER INPUT CONTROL CIRCUITS
Filed Sept. 26, 1961    3 Sheets-Sheet 3

INVENTORS
ROBERT J. S. BROWN
JOHN E. COOLIDGE
BY
ATTORNEYS

3,204,178
AMPLIFIER INPUT CONTROL CIRCUITS

Robert J. S. Brown, Fullerton, and John E. Coolidge, Anaheim, Calif., assignors, by direct and mesne assignments, to Borg-Warner Corporation, Chicago, Ill., a corporation of Illinois, and California Research Corporation, San Francisco, Calif., a corporation of Delaware
Filed Sept. 26, 1961, Ser. No. 140,807
3 Claims. (Cl. 324—.5)

This invention relates to an electronic circuit for controlling the effective resistance of the input of an amplifier circuit. More particularly, the invention relates to a method and apparatus for manipulating the Q of a circuit connected to the input of a signal detection circuit and amplifier stage.

When logging an earth formation for the presence of hydrogen nuclei by means of nuclear magnetic logging, it is essential that the circuit used for detecting nuclear induction signals be tuned to precession signal frequencies. It is further essential that the circuit be responsive to signal transients of short duration. In the detection of free precessional signals from polarized nuclei precessing in the earth's magnetic field, the frequency of precession is approximately 2 kc., but the signal transient that is to be detected may be only several hundred milliseconds in time duration. For well logging purposes, it is desired to see the precessional signals occurring approximately 10 milliseconds after precession begins and to detect accurately the signal amplitude and frequency of these signals for the short duration that they exist, of the order of 20 to 100 cycles of the signal.

While a sharply tuned high Q circuit is preferred for detecting continuing low power signals, the use of such a circuit requires a prior knowledge of the frequency of the signal to be detected and generally a continuously oscillating input signal of quite long duration. Neither of these preferred conditions is present in the usual well logging experiment. The precession signals will generally have the same basic frequency but will include many other frequencies and will be of short time duration. To be useful in well logging signal reception, the detection circuit must be detuned to broaden the reception frequency band and at the same time the circuit should respond to short duration excitation signals. The circuit must also have a relatively high signal to noise ratio. Broadening the reception frequency band of the detection circuit, as above, means lowering the Q where $$Q = \frac{\text{resonant frequency}}{\text{band pass frequency width}}$$

The effective Q of a parallel circuit of inductance and capacitance may be lowered by adding a resistance element in parallel with the L and C. Furthermore, the circuit may be critically damped so as to prevent oscillation with a resistance equal to $$\frac{1}{2}\sqrt{\frac{L}{C}}$$

With a critical resistance across the parallel circuit, the energy stored in the inductance and capacitance is dissipated without oscillation.

For the purposes of well logging, the detection circuit should have a lowered Q for broader band width but a somewhat higher Q for signal detection. This appears unreconcilable but may be accomplished in the manner of the present invention.

A further complication of the foregoing problems is encountered with a nuclear magnetism well logging tool. The nuclear magnetism well logging tool employs a coil constituting a number of turns of a conductor through which a current is caused to flow to generate a strong polarized magnetic field. The polarization field generated by the coil is maintained in existence for a prescribed period of time, in accordance with the well logging method, to insure polarization of a suitable number of atomic structures, usually nuclei. After polarization has been accomplished, the current through the coil is terminated and the polarizing field is caused to collapse in as short a period as is both mechanically and electrically possible. The collapse of the polarization field on the conductors of the coil inherently causes a voltage to be generated in the polarizing coil. This voltage and the resulting current represents a quantity of energy stored in the inductance of the polarization coil which must be rapidly dissipated to leave the nuclear precession undisturbed as well as to permit the coiled conductor to be used as a signal detector. While the resistance through which this energy must be dissipated is preferably the critical damping resistance of the coil and its distributed capacitance alone, another value of resistance is needed to provide a satisfactory Q in the detection mode of operation. For the purposes of current collapse, the resistance must be small to insure rapid decay without oscillation, but for detection at an adequate signal to noise ratio the loading resistance will have to be a different quantity.

In view of the foregoing, it may be seen that the input circuit to the signal detection and processing stage of this form of well logging tool must be designed with particular attention to two somewhat irreconcilable requirements. The first is that the input stage must be receptive to precession signals at the frequency of precession of the polarized atomic structures, and the second is that the large amount of stored energy generated in the polarizing coil by the collapse of the polarization field must be dissipated in as short a period as possible to eliminate complete blocking of the input amplification stage during the extremely short precession period. It has been found in the design of the nuclear magnetism well logging tool that a circuit having a Q of approximately one is preferred for the dissipation of the self-induced currents. On the other hand it has been found that for signal detection the Q should be raised to the unloaded Q of the tank circuit.

One method for controlling the Q of the input stage of the signal detection circuit would be to vary the amount of resistance in the circuit by switching during the early portion of the signal detection period. It has been found that switching in the time period that is permitted for signal detection becomes extremely difficult and causes "ringing" oscillations as the switching operations are performed. Furthermore, a resistance element is inherently a "noise" generator and is undesirable in the signal detection circuit in the different sizes needed for continuous Q control.

In accordance with the present invention, the problems of switching and resistance changes are alleviated by a Q control including both resistance circuits and an inverse feedback circuit to the input of the signal detection amplifier. With the Q control circuits the main surge of self-induced energy is dissipated in a first circuit and, as the first circuit becomes less effective, the feedback circuits continue a control at the desired resistance values. With this inverse feedback circuit the self-induced energy is dissipated initially into a circuit having an effective Q of approximately one. After the main surge of self-induced energy has been dissipated, the Q is maintained at a reduced value to prevent circuit oscillation while the amplifier stage becomes receptive to precession frequency signals with a minimum amount of resistance in the input circuit. The control of Q, as above, provides for a minimum amount of noise generators in the input circuit and the desired broad-banding of the circuit. Furthermore, the Q of the input circuit may be raised by control of certain constants in the feedback circuit after the self-induced potentials have been dissipated.

The object of the present invention is an electronic Q control circuit for the input network of an amplifier stage.

Another object of the present invention is an electronic circuit useful in permitting the observation of nuclear magnetic precession signals a short time period after the beginning of precession.

Another object of the present invention is a multi-step control of circuit elements whereby the Q of an input network may be raised to improve the response of an amplifier stage to desired signals.

A further object of the present invention in accordance with the preceding objects is the control of Q of an amplifier input network through the use of a feedback circuit and the variation of the controlled Q by variations of circuit elements within the feedback circuit.

Further objects and features of the inventtion will be readily apparent to those skilled in the art from the specification and appended drawings illustrating certain preferred embodiments in which.

Figure 1:
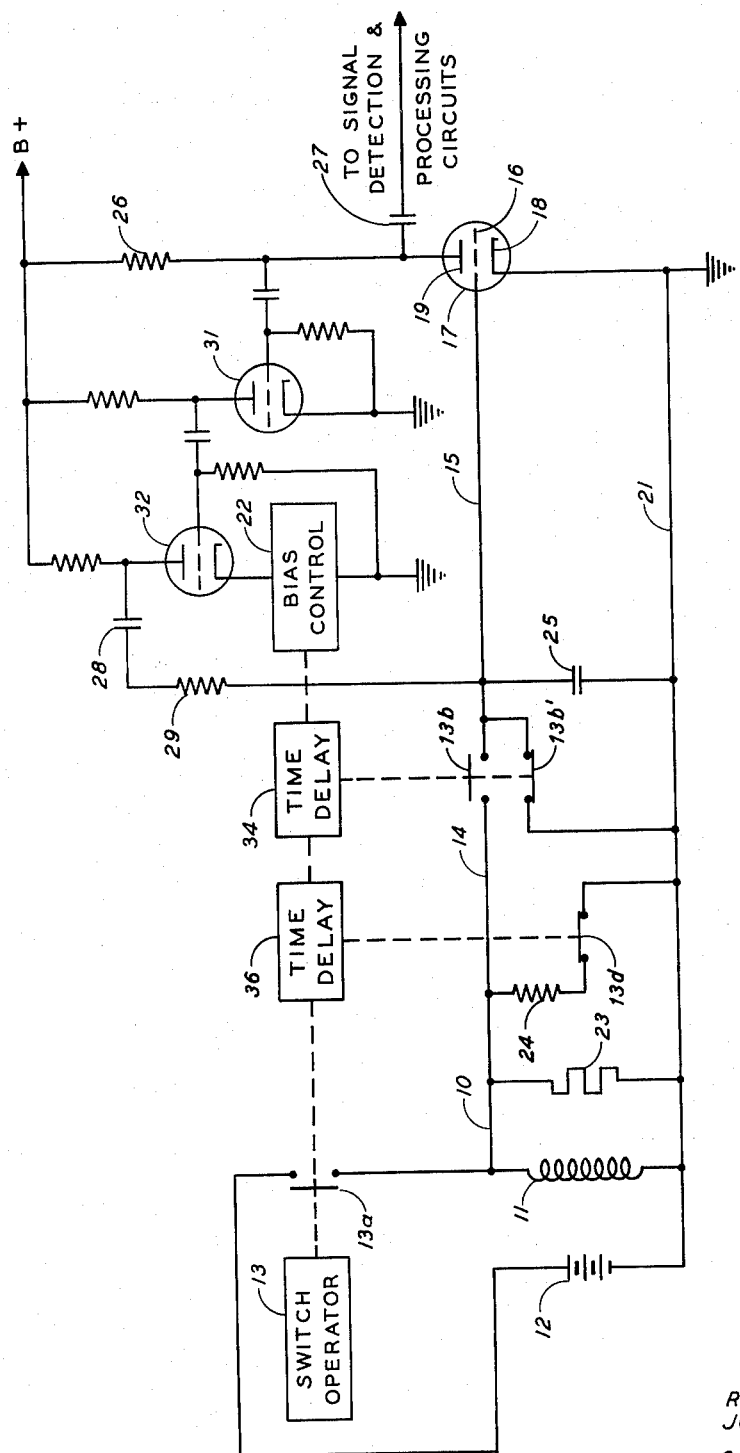
FIG. 1 is a schematic diagram illustrating a circuit for energizing a polarization coil and for controlling Q of the input network of an amplifier stage in a nuclear magnetism well logging system.

FIG. 1 is a schematic diagram illustrating the use of the Q control circuits of the present invention. The control circuits are particularly adapted to the controlled energization of and later connection of a nuclear magnetism logging tool polarizing coil to signal detection and processing circuits. In the control circuits, a coil 11 is shown as connectable to a source of energization, as at battery 12, through switch contacts 13a controlled by switch operator 13. One end of the coil 11 is connected by conductors 10, 14 and 15, through switch contact 13b, when closed, to the control grid 16 of an electronic vacuum tube 17 having a cathode 18 and an anode 19 and constituting the first stage of a signal detecting and processing circuit. The other end of the coil 11 is connected by conductor 21 to the cathode of the vacuum tube 17 and to ground.

Between the conductors 10, 14, 15 and ground at 21 are several circuit elements paralleling the coil 11 including a resistance element 23 (having a resistance that varies inversely with the voltage applied to it, for instance, a thyrite resistor) a second resistance element 24 and a capacitor 25. Contacts 13d are provided in series with the resistance element 24 and contacts 13b' are provided between conductor 15 and ground.

The anode circuit of the tube 17 includes a load resistor 26 for the development of signals passing to further amplifier stages through capacitor 27 and additional circuits not shown. A feedback circuit of capacitor 28 and resistor 29 is driven from the anode circuit and connected to the control grid 16 through electron tube stages 31 and 32 including a cathode bias control circuit 22 in stage 32. Stage 31 is added to provide for proper phase relationship.

The operation of the FIG. 1 circuit and its various circuit elements will now be described. Initially switch operator 13 is actuated to close contacts 13a to energize coil 11 from battery 12 thus establishing an electromagnetic field. At this time in the switch operation, switch contact 13b is open and contacts 13b' and 13d are closed. Capacitor 25 and the vacuum tube 17 are disconnected from the battery supply 12 and connected to ground through contacts 13b' so as to be isolated from the energization circuit. In the use of the FIG. 1 circuit in a nuclear magnetism logging tool, the coil 11 is employed for the generation of the strong polarization magnetic field at an angle to the field to be used as a precessional field. A nuclear magnetism well logging tool is shown and described in the copending application of P. E. Baker et al., Serial No. 337,384, filed February 17, 1953, for Analytical Device, and assigned to the same assignees as the present application.

After a prescribed period of time or after a pre-programmed energization of the coil 11, the contacts 13a are opened and the magnetic field of the coil 11 is permitted to collapse. Inherent in the disconnect of the battery 12 from the coil 11 and the collapse of the electromagnetic field of the coil is the generation of a self-induced potential in its windings. But, for nuclear magnetism logging purposes, the polarization field generated by the coil must be collapsed in an extremely short period. The continuance of the field, as by the self-induced potential, cannot be tolerated if good precessional signals are expected. For detectable precession, it is required that the polarization field shall be shut off in a time short compared to the relaxation time of polarized atomic particles. The requirement will be obvious considering that there will be little or no polarization left if the polarizing field is shut off so slowly that the polarization can die out as the field decreases.

The most rapid field decay can be obtained with the coil unloaded, i.e., with a substantially zero resistance path in parallel with the coil. Unfortunately the magnitude of the voltages induced would be destructive to not only the coil itself but to the associated electronics. On the other hand a low resistance across the coil which will maintain the transient voltage within reasonable workable limits will make current cutoff too slow for nuclear magnetism logging. The circuit of FIG. 1 overcomes these difficulties by providing an initial discharge path for the self-induced current including the thyrite resistor 23 connected across the coil during energization from the battery 12. This resistor has the characteristic of being a low resistance to high voltage and a high resistance to low voltage and thus provides a low resistance discharge path which limits self-induced potential to a workable value but a gradually increasing resistance as the potential drops. During the early portions of the discharge of the self-induced potential the thyrite resistor provides adequate control of the transient but, as its resistance increases, its control of the discharging current becomes inadequate. The higher thyrite resistance raises the Q of the LCR circuit of the coil, its distributed capacitance and the thyrite resistor from a value of about 1 until eventually the circuit approaches a condition that could permit current oscillation or "ringing" as the remaining stored energy is dissipated. Thus following thyrite recovery the current must be further damped to prevent excessive circuit disturbances. That is accomplished by having resistor 24 connected in a parallel circuit with coil 11 and thyrite resistor 23 through contacts 13d.

The resistance value of resistor 24 is appropriate for critical damping of the coil 11 at the frequency of resonance of the coil with its distributed capacitance. It should be noted that this resonant frequency is not the same as the frequency of precession signals to be detected from the polarized atomic particles within the formation, but is the frequency at which the coil and its capacitance would oscillate or ring if energized by a circuit transient during switching operation. The coil must be critically damped if these oscillations are to be prevented while the coil is still unloading the energy generated by self induction. The value of the resistance is determined by the previously stated formula $$\tfrac{1}{2}\sqrt{\tfrac{L}{C}}$$

After a suitable time to allow proper damping action by resistor 24, contacts 13b' are opened and 13b closed. The amount of delay is predetermined and controlled by time delay element 34. This action connects to the coil 11 the first stage of the signal detecting and processing circuits constituting vacuum tube 17 and its associated input circuit components including the tuning capacitor 11 and at times the damping elements 23 and 24. Resistor 24 continues the critical damping of the coil with its distributed capacitance while capacitor 25 tunes the coil to the frequency band of the precessional signals to be detected. With the resistor 24 in the circuit the Q of the input network is slightly raised but still retained at a low level, approximately 1.3.

Still later, contacts 13d are opened by its time delay 36 and resistor 24 is removed from the input network. The thyrite resistor 23 is still in the circuit but now appears as an almost infinite resistance to the extremely low voltages. After contacts 13d are opened the Q of the input network is raised a little but is still held at a low value, approximately 13, by the feedback network associated with electronic vacuum tube 17 connected to the coil by contacts 13b.

The foregoing discharge path circuits prevent current oscillations in the damping circuits as well as avoid blocking of the vacuum tubes in the signal detection and processing circuits. The amplifiers are therefore able to respond to precessional signals. These circuits, however, are only effective to a limited reduction of the self-induced currents and other noise transients. A further effective circuit control is provided in the discharge paths by the feedback circuit of capacitor 28 and resistor 29. The effect of this circuit is to provide a reasonably low resistance path for discharge of self-induced voltages and noise transients by maintaining the Q of the circuit at a value of approximately 13. However, while the Q of the input network is appropriately lowered and the band width broadened, the signal to noise ratio of the network is maintained at a value corresponding to that of the same circuit in an unloaded condition as will be discussed subsequently. This control of the vacuum tubes permits them to respond to precession signals with an adequate signal to noise ratio much sooner after precession begins.

In the example of the use of this circuit in a nuclear magnetism logging system, blocking of the signal detection and processing amplifier tubes could cause them to be nonresponsive to detectable precession signals during the period when these signals are the strongest. Precession of the polarized particles begins as soon as the precessional field exceeds the polarization field and continues until the particles either become aligned with the precessional field or until they become so randomly aligned with each other as to make any composite signal undetectable. That period may be quite short and is generally of the nature of less than 100 milliseconds. It is desirable that the signal detection circuit be in condition to detect precession signals immediately after precession begins; however, such a timing is substantially unattainable particularly where the same coil is used for both polarization and signal detection because of the self-induced voltages and other noise transients just described. With the present circuit, signal detection can be accomplished approximately 15 milliseconds after the removal of the energization from the polarization coil with an adequate signal to noise ratio.

The improved response time is further aided by the control of the Q of the input network particularly during that period controlled by the use of the inverse feedback circuit. In the inverse feedback arrangement the effective (loading) resistance is derived from the resistance 29 and has the electrical effect in the grid circuit of the anode to grid resistance divided by the gain of the stages 17, 31 and 32. For example, if the resistor 29 were 2 megohms and the gain of the stages were 10, then the effective resistance across the input of tube 17 would be 200,000 ohms. This relationship has been mathematically illustrated in "Vacuum Tube Amplifiers," Valley and Wallman, Radiation Laboratory Series, vol. 18, McGraw-Hill. That same article illustrates that the method of broad banding a tuned input stage by feedback as used in the present invention, is also accompanied by a corresponding reduction in noise such that the signal to noise ratio of the input circuit is only slightly reduced from that of the unloaded tuned circuit value. The signal to noise ratio through the input network is thus retained at a usable value with a broadband, low Q circuit which will provide rapid recovery from transient disturbances in the input and thus early viewing of the nuclear magnetism logging signal.

An alternative method of obtaining the desired broadbanding of the input circuit would employ a resistor directly in parallel with the tuned circuit. It can be shown that as the circuit is loaded by the resistor, the output voltage is reduced directly with Q while the noise remains essentially constant with Q. The signal to noise ratio is thus reduced directly with Q.

With the input circuits of the several resistance and associated switches operated as above, a desired result has been accomplished. The Q has been controlled to accelerate the dissipation of self-induced currents and the signal detection and processing stages are driven by a low Q, low noise generating network. Furthermore, noise transients in the network are damped rapidly while signals are handled without loss in signal to noise ratio.

An additional feature is provided by the control of Q with the feedback circuit of the present invention. This feature is accomplished by controlling the gain of a portion of the feedback circuit to reduce the amount of voltage fed back to the grid of the input network. The gain of the overall feedback stages of tubes 17, 31 and 32 is controlled by varying the bias between cathode and grid of tube 32. Increasing the bias by bias control 22 varies the gain through tube 32 and can be adjusted to cut off the tube. When cut off, no feedback signal is supplied and the effect of resistance 29 in the grid circuit of tube 17 is eliminated. Maximum signal to noise ratio of the input circuit is then obtained. A gradual variation of the gain of these several stages may thus vary the Q of the input network between its low value of around 10 to a higher value of the unloaded tank circuit of coil 12 and capacitor 25. This increase in Q can be accomplished in 10 to 15 milliseconds without circuit ringing. The increased Q value may be of the order of 60 or higher. After the feedback circuit has been forced to cutoff, the detected signals will be passed through capacitor 27 to the remaining signal detection and processing circuits. Coil 12 will now be tuned to precession signals, all circuit transients will have been damped to prevent unwanted circuit oscillation, and maximum signal to noise ratio detection is possible 25 to 30 milliseconds after start of precession.

Figure 2:
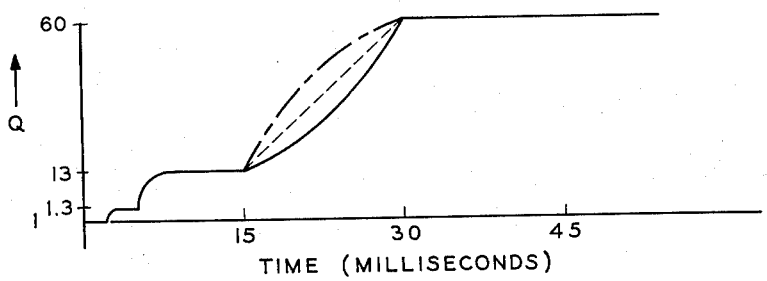
FIG. 2 is a graph of the variation of Q with respect to time illustrating the control exerted by the present invention.

The bias control circuit may be mechanically or electrically connected to the switch operator 13 or to time delay 34 and may supply a signal in the form of a gradual ramp voltage. As shown in FIG. 2 the ramp voltage will operate to raise the Q from the low value, approximately ten, to the higher value, approximately 60, in the desired period. It has been found that the Q should be raised in an exponentially increasing manner as shown in solid lines to avoid oscillations within the circuit. If either the dash-dot asymptotic line or the dashed linear line is employed to increase the Q, the circuit may respond by oscillating at its natural resonant frequency. On the other hand, with the Q increased in the manner of the solid exponential line, unwanted oscillation is less likely while the circuit will respond to the precessional signals induced into the coil 11.

Figure 3:
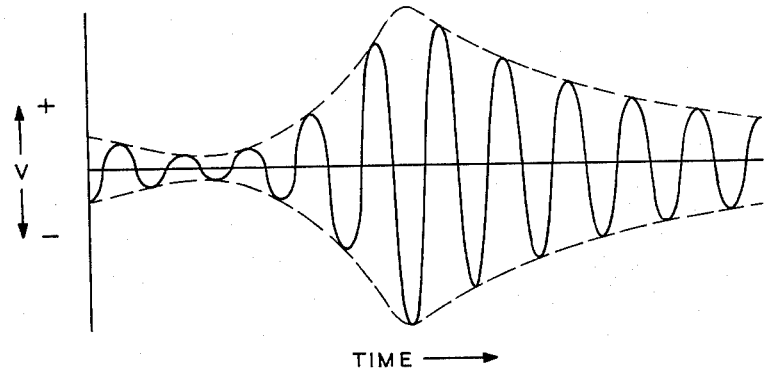
FIG. 3 is a waveform diagram of a precessional signal illustrating the amplifier stage output signal strength variation as the Q of the input network is varied in accordance with the present invention.

With these electronic Q control circuits, one provided by negative feedback from the plate circuit and another provided by a bias control in the cathode circuit, the well logging tool is permitted to respond to precessional signals with maximum signal to noise ratio much sooner after the polarization power has been removed. As shown in FIG. 3 the amplifier output signal will provide a low amplitude degenerating initial portion while the Q of the input stage has been lowered by the damping circuits and the feedback circuit. After the bias control circuit has been energized, the Q of the circuit is increased, the circuit then becomes less degenerative and provides increased amplification of the precessional signals to display an increased signal envelope. After the Q has been raised by the operation of the bias control circuit, the normal decay pattern for the precessional signal continues until the signal level is too low to permit useful signal detection.

Many alternative circuits may be devised to satisfy the required current dissipation and transient damping as is accomplished by the circuit illustrated in FIG. 1. It has been found that the combination of elements illustrated and their order of effective insertion and removal from the network provides an effective circuit for the early detection of precession signals. In free precession, nuclear magnetism well logging it is essential that signals be detected as early as possible after precession begins. Under some well logging conditions precession signals are below the detectable level within a few tens of milliseconds after precession begins. If only a little of these signals can be detected, some data can be collected. The earlier the signal can be observed the more valuable and the more dependable will be the data.

Figure 4:
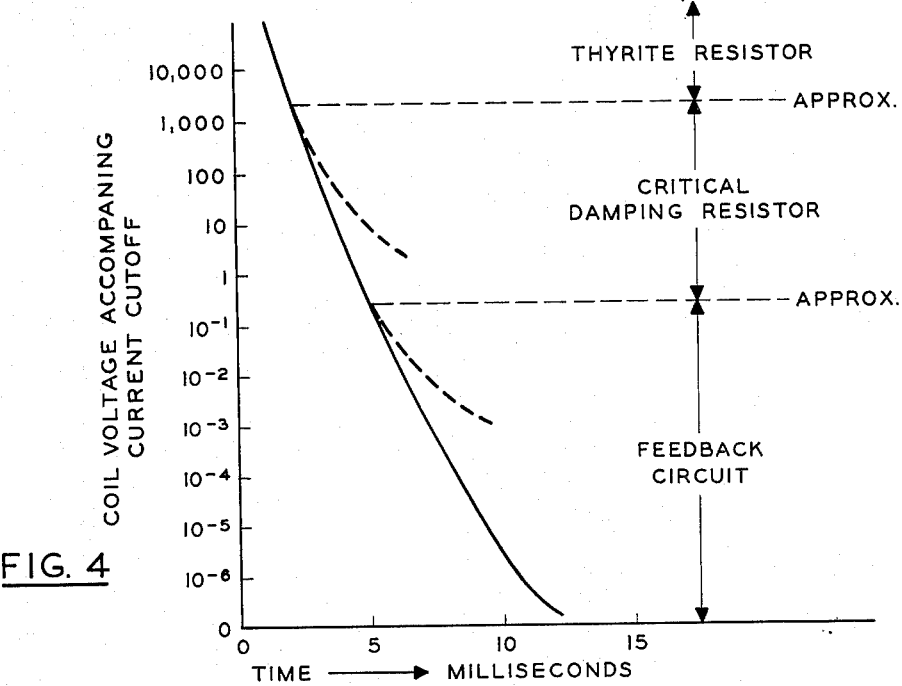
FIG. 4 is a graph of voltage with respect to time illustrating the effect of the control exerted by the various elements within an input network.
Figure 5:
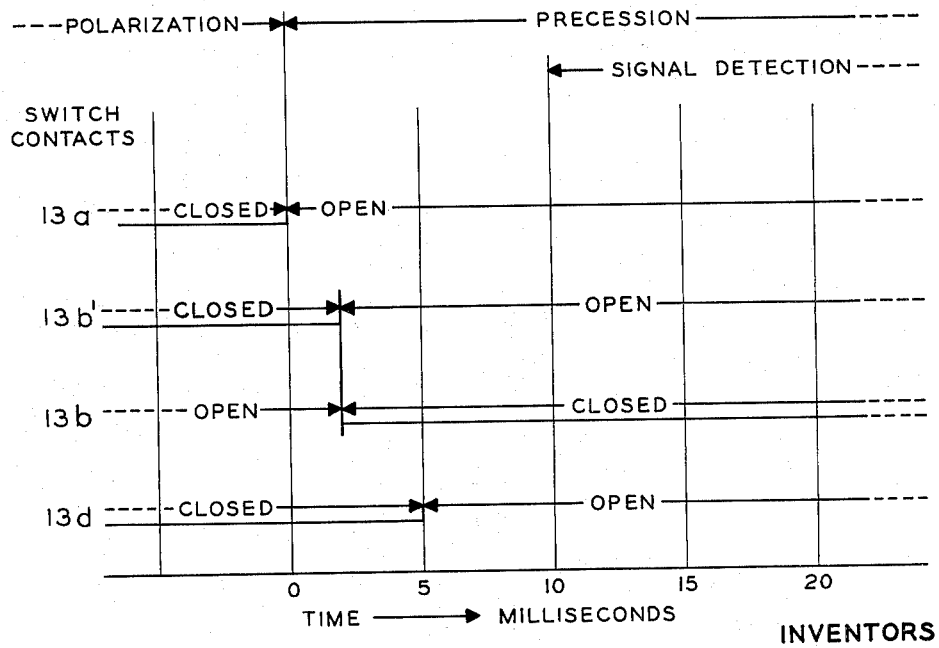
FIG. 5 is a switching time sequence chart for the switch contacts and time delays of FIG. 1.

FIGS. 4 and 5 illustrate manner in which the self-induced voltages are damped with the circuit of FIG. 1 and the order of operation for the various switch contacts. FIG. 4 also indicates the relative areas of control for the several discharge and damping circuits illustrated in combination in FIG. 1.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

We claim:

1. In a nuclear magnetism well logging precession signal detection amplifier circuit, a voltage transient dissipation circuit in said detection circuit comprising a feedback circuit between the output of said amplifier circuit and the input of said amplifier circuit for lowering the Q of the input network to said amplifier, said feedback circuit including a resistance element having an electrical size determined by the inductance and capacitance in said input network and the gain of said amplifier to reflect into the input network an effective resistance for critically damping transient voltages in said network, and means in said feedback circuit for controlling the reflected electrical size of said resistance element into said input network to vary the Q of said network.

2. In a nuclear magnetism well logging apparatus wherein a polarizing coil is employed to generate a magnetic field for polariziing nuclei of hydrogen atoms, and for detecting precession signals from said nuclei, said coil being energized from a source of direct current through suitable switching means including means for connecting said coil to precession signal detection and processing means, and wherein said coil is connected to said source and energized for a predetermined period, then disconnected from said source to be de-energized and then connected to said signal detection and processing means; the improvement comprising a negative feedback circuit including a variable circuit element between the output of said signal detection and processing means and said polarizing coil, means for controlling the characteristics of said negative feedback circuit to reduce the Q of said coil while self-induced currents through said coil are being dissipated, and means for varying said circuit element in said feedback circuit to decrease the electrical effect of said feedback circuit and thus increase the Q of said coil in a period of time substantially less than the thermal relaxation time of said polarized nuclei.

3. Apparatus for controlling the Q of an input network between a signal amplifier and a coil and wherein said coil has a large self-induced potential induced therein, comprising:

(a) a first resistance element, means connecting said first element to said coil, said first element being variable and having a resistance that varies inversely proportional to the potential applied thereto, (b) a second resistance element, means connecting said second element to said coil, said second resistance element having a resistance adjusted to critically damp the inductance of said coil and the distributed capacitance within said coil, (c) a third resistance element, a capacitor, means for connecting said third resistance and said capacitor to said coil, said third resistance element being reflected as an effective resistance in the input circuit to said amplifier by a feedback circuit from the output of said amplifier, said effective resistance being predetermined to damp said input circuit, (d) and means for interrupting said feedback circuit to disconnect said reflected third resistance from said coil, (e) and means for operating said means for connecting and disconnecting said resistance elements in a time related sequence to connect said resistance elements in a prescribed order.

References Cited by the Examiner

FOREIGN PATENTS

| 235,176 | 3/60 | Australia. |
| 1,236,724 | 6/60 | France. |
| 864,941 | 4/61 | Great Britain. |

OTHER REFERENCES

Cahill et al.: Journal of Geophysical Research, vol. 61, No. 3, September 1956, pages 547–558 incl.

CHESTER L. JUSTUS, *Primary Examiner.*

MAYNARD R. WILBUR, *Examiner.*